DIGITAL CORRELATION SYSTEM HAVING AN ADJUSTABLE IMPULSE GENERATOR

Filed April 25, 1963 4 Sheets-Sheet 1

INVENTOR.
CABELL N. PRYOR

BY D. C. Hodges

ATTY.

DIGITAL CORRELATION SYSTEM HAVING AN ADJUSTABLE IMPULSE GENERATOR

Filed April 25, 1963

INVENTOR.
CABELL N. PRYOR
BY D. E. Hodges
ATTY.

INVENTOR.
CABELL N. PRYOR
BY [signature]
ATTY.

Feb. 7, 1967 C. N. PRYOR 3,303,335

DIGITAL CORRELATION SYSTEM HAVING AN ADJUSTABLE IMPULSE GENERATOR

Filed April 25, 1963 4 Sheets-Sheet 4

INVENTOR.
CABELL N. PRYOR

BY D. C. Hodges

ATTY.

3,303,335
DIGITAL CORRELATION SYSTEM HAVING AN ADJUSTABLE IMPULSE GENERATOR

Cabell N. Pryor, Silver Spring, Md., assignor to the United States of America as represented by the Secretary of the Navy
Filed Apr. 25, 1963, Ser. No. 276,141
2 Claims. (Cl. 235—181)

The invention described herein may be manufactured and used by or for the Government of the United States of America for governmental purposes without the payment of any royalties thereon or therefor.

The present invention relates to a signal filter and more particularly to a signal filter having a very general response characteristic which can be conveniently adjusted.

In the field of matched filtering wherein it is desirous to detect a pulse of known characteristics by signal processing, it has been the general practice to employ signal filters having their response characteristic specified in the frequency domain. Although filter devices operating in accordance with this technique have served the purpose, it has been determined that the desired filter characteristic can be more easily determined in the time domain wherein the filter characteristic can be classified or specified in terms of its impulse response rather than the equivalent frequency response.

The general purpose of this invention is to provide a signal filter which embraces all the advantages of similarly employed signal filters which have their filter response specified in the frequency domain and which does not possess the disadvantage of indirect synthesizing of the desired impulse response in the frequency domain. To attain this, the present invention contemplates a unique digital filtering system wherein the synthesizing of the desired input response is carried out directly in the time domain through automatic and repeated evaluation of the convolution integral.

An object of the present invention is the provision of a flexible digital filter for simulating the desired filter functions.

Another object is to provide a very flexible piece of laboratory apparatus for matched filtering experiments.

A further object of the invention is the provision of a digital filter for evaluating impulse response characteristics in real time.

Still another object is to provide a digital filter having an adjustable impulse response to detect pulse signals in the presence of a noise background via matched filtering techniques.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a block diagram illustration of a matched filtering technique;

FIG. 2*a* shows a graphical representation of an input signal to the digital filter;

FIG. 2*b* shows a graphical representation of an output signal of the digital filter;

Figure 1:
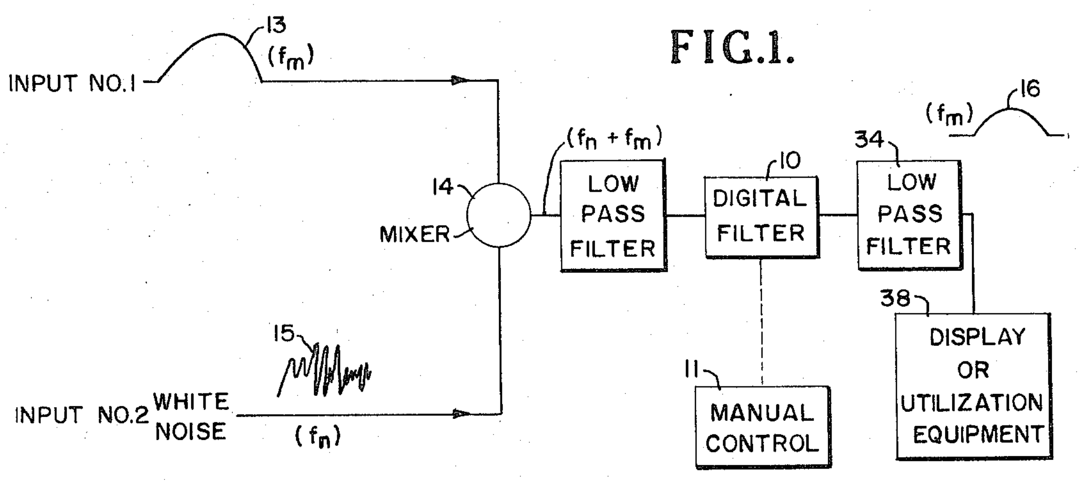
Figure 2A:
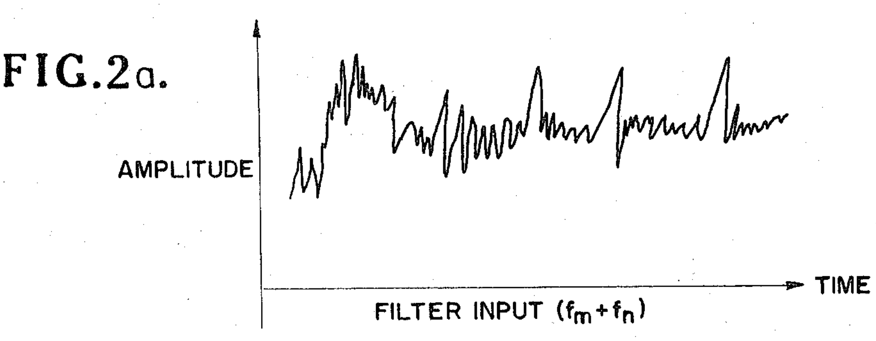
Figure 2B:
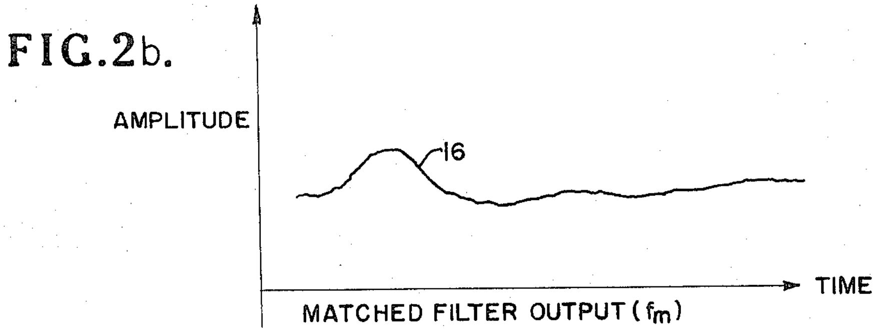

Referring now to the drawings, wherein like reference characters designate like or corresponding parts throughout the several views, there is shown in FIG. 1 the digital filter 10 which has an adjustable impulse response that can be controlled by the manual control 11. The input pulse 13 which is to be detected by the matched filter technique is supplied as one input to the mixer 14. White noise 15 is supplied to a second input terminal of the mixer 14 and mixed with the input pulse 13 to provide the input signal to the digital filter 10. This input signal consists of the noise signal $f_n$ and the input pulse or message signal $f_m$ and is shown in FIG. 2*a*. After the digital filtering processing, to be hereinafter disclosed in detail, the signal emerging from the output of the digital filter appears as shown at 16 in the form of the message signal $f_m$ or input pulse which is also graphically set forth in FIG. 2*b*.

In order to detect the pulse signals from the noise background utilizing the matched filter technique, it is necessary to maximize the ratio of the pulse signals to the white noise background. It can be shown that the peak output due to the signal pulse divided by the R.M.S. noise output, i.e., the signal-to-noise ratio, can be maximized by passing the signal and noise through a linear filter whose impulse response $h(t)$ is given by:

$$h(t)=s(T_1-t) \qquad (1)$$

where $s(t)$ is the shape of the input pulse and $T_1$ is a delay required to allow physical realizability of the filter. This operation is equivalent to a cross-correlation of the input pulse and noise with a stored replica of the input pulse waveform.

The convolution integral giving the output $g(t)$ of a filter having $n$ taps with T time delay per tap, an impulse response $h(t)$, and input signal $f_{in}(t)$ takes the general form:

$$g(t)=\int_{u=0}^{u=\infty} h(u)f(t-u)du \qquad (2)$$

where $u$ is the integration variable for discrete values $n$T. Therefore, if the input signal $f_{in}(t)$ consists of an input pulse $f_m(t)$ and a noise signal $f_n(t)$, the solution of Equation 2 is merely a matter of adjusting the impulse response $h(t)$ to satisfy Equation 1 above. When this condition exists, $g(t)$ is the autocorrelation function of $f_m$ and represents the desired optimum signal-to-noise ratio set forth above.

Figure 3:
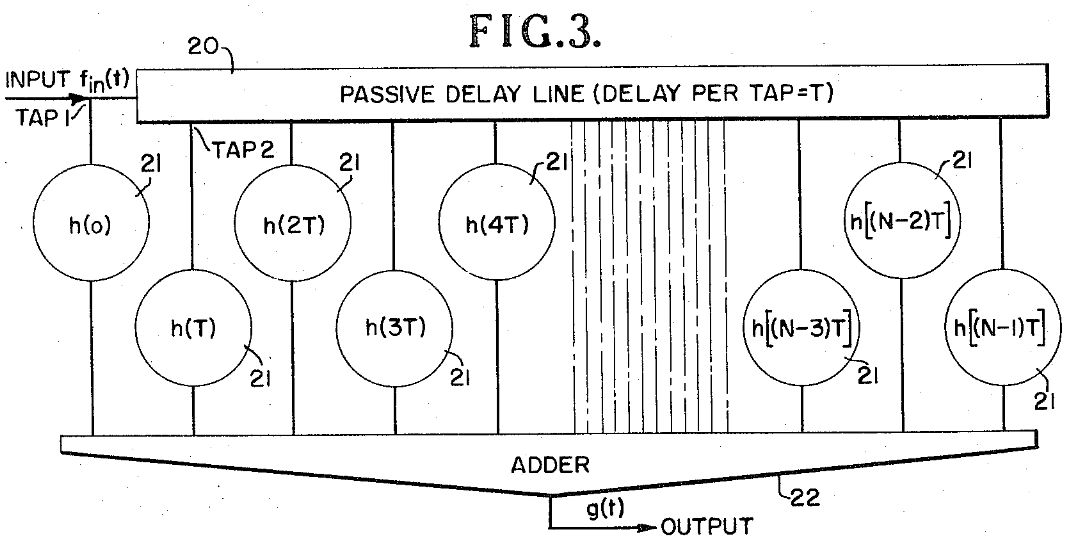
FIG. 3 is a block diagram schematic of an adjustable filter which utilizes a passive delay line.

An adjustable filter such as that shown in FIG. 3 can be employed for realizing general impulse responses which vanish after a finite time. The input $f_{in}(t)$ is supplied to a passive delay line 20 having a plurality of taps at spaced intervals whereby the delay per tap is T. Adjustable coefficient potentiometers 21 are connected to the delay line taps in order to multiply the signal appearing at the individual taps by the preset values of the potentiometers. Summing the products formed by this multiplication in the adder 22 provides the desired output $g(t)$, since the signal at the time T on a given tap N of the delay line is $f(t-n\text{T})$. The output of the entire system may be written in the following form:

$$g(t)=\sum_{m=0}^{m=N-1} h(nT)f(t-nT)$$

which is the discrete analog of the convolution integral, where the settings of the coefficient potentiometers are $h(n\text{T})$ and correspond to the values of the impulse response $h(u)$ at discrete points.

Figure 4:
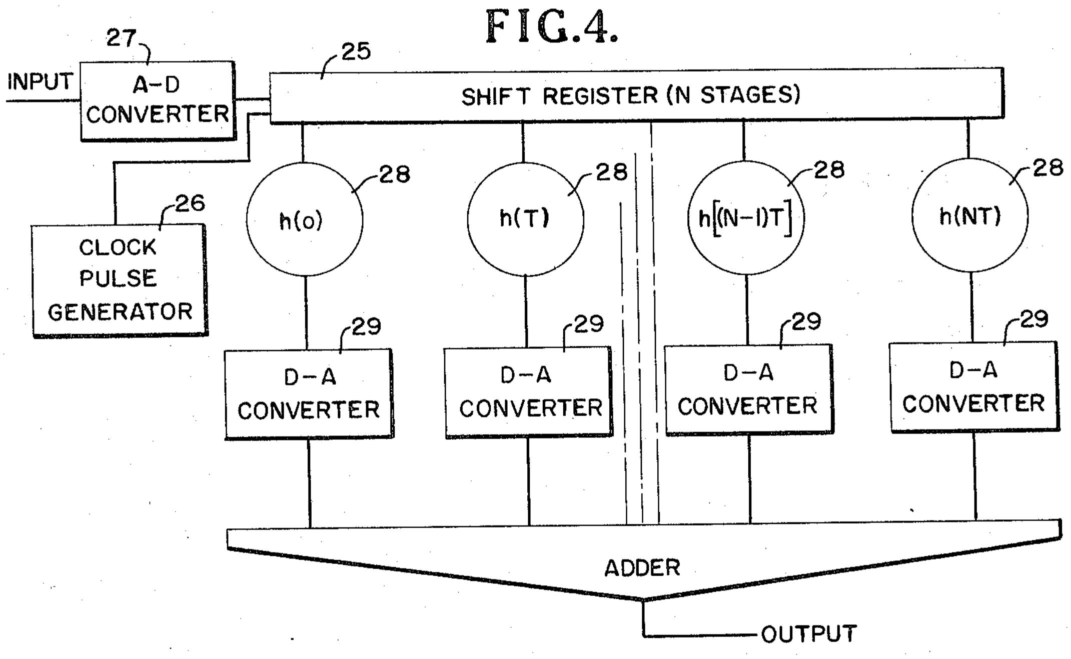
FIG. 4 is a block diagram representation of a digital filter.

To increase the range of operation of an adjustable filter such as that shown in FIG. 3, it is desirable to provide digital shift registers instead of a passive delay line for delaying the signal supplied to the coefficient potentiometers. FIG. 4 shows a block diagram schematic of an adjustable filter such as that shown in FIG. 1 wherein a digital shift register 25 is utilized to provide the desired time delay of the input signal to the filter. The digital shift register 25 can be shifted by clock pulses supplied by the clock pulse generator 26, whereby the time delay per tap is readily variable and dependent upon the shift pulse frequency of the clock pulse generator 26. Utilizing the shift register necessitates converting the input analog signals into a digital code for transmission along the shift register. An analog-to-digital converter 27 converts the analog input signal into digital form and in order to maintain consistency, the coefficient multipliers 28 which provide the function $h(nT)$ are also specified in digital form. The outputs of the digital multipliers 28 may be converted back to analog form and added to produce the filter output. The digital-to-analog converters 29 are shown in FIG. 4. It should be noted that one coefficient multiplier and one digital-to-analog converter is required for each delay line tap in this arrangement.

Figures 5, 6:
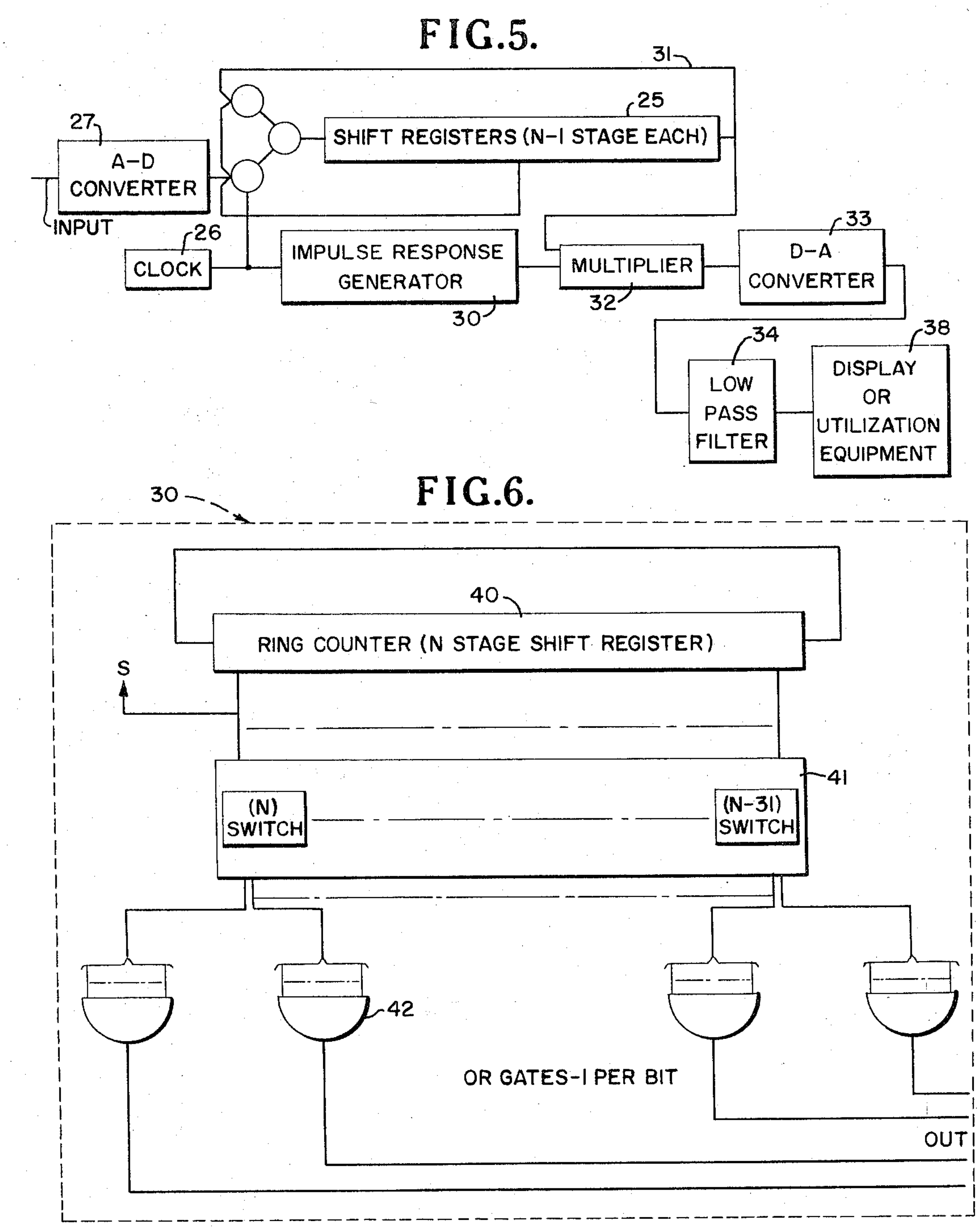
FIG. 5 is a block diagram representation of a digital filter wherein time sharing of a single digital multiplier is employed.
FIG. 6 is a block diagram schematic of the impulse response generator.
Figure 7:
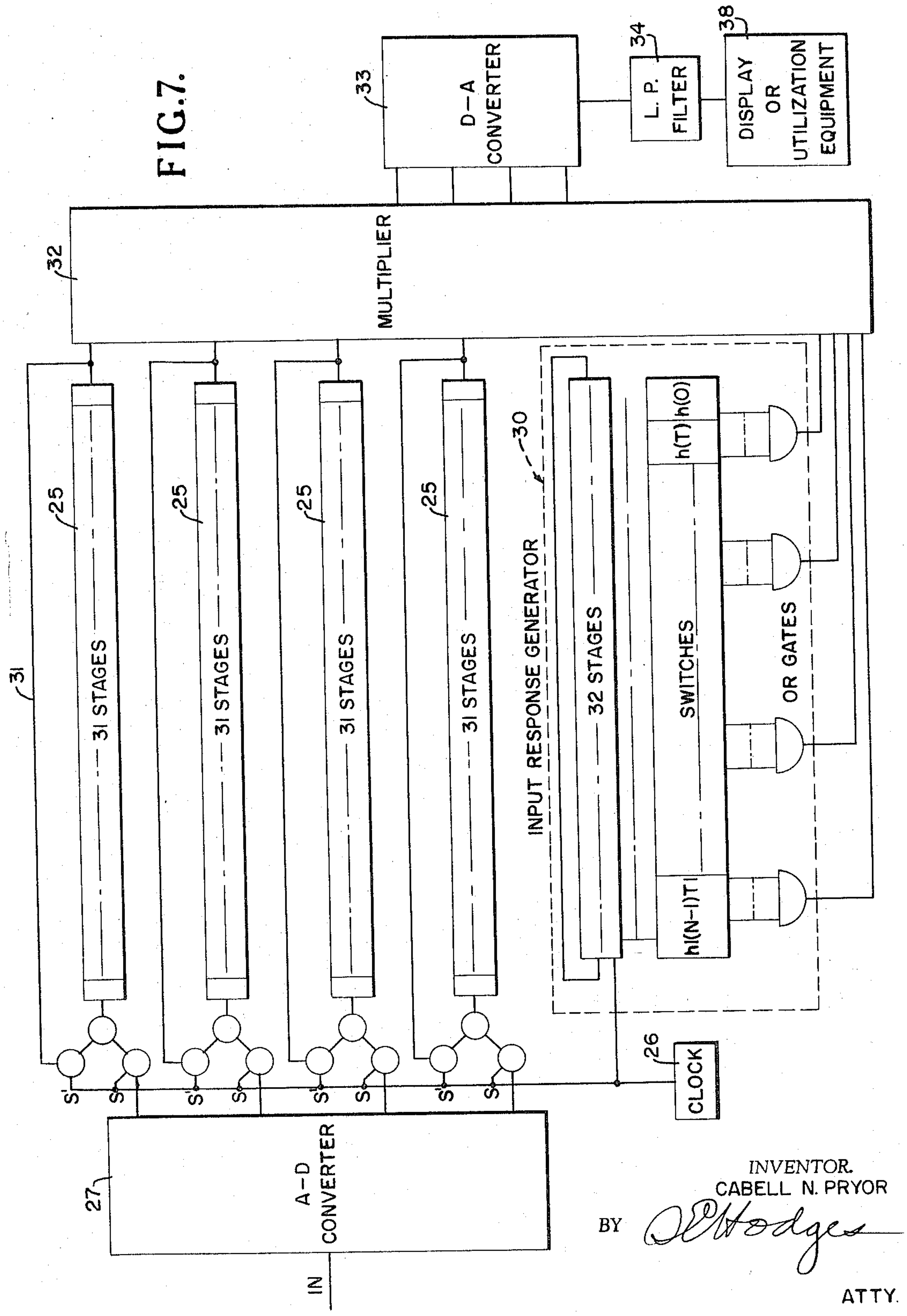
FIG. 7 is a block diagram illustration of the digital filter composed of modules which provide a matched filter output as shown in FIG. 2*b* when supplied with the input shown in FIG. 2*a*.

Since the digital multipliers are the most complex single part of the system, a system which reduces the number of multipliers by time-sharing a single multiplier among all the output taps is more economical than the arrangement shown in FIG. 4. This can be accomplished by time compressing the input signal which is known as Deltic processing as set forth in U.S. Patent 2,958,039 to Victor C. Anderson. FIGS. 5 and 7 show systems wherein time-sharing of a single multiplier is accomplished. FIG. 5 shows a general block diagram representation of such a system while FIG. 7 shows a system which utilizes a parallel series of four shift registers to accommodate a four-bit digital word. Also FIG. 7 shows the impulse response generator 30 (which will hereinafter be described in more detail) as a series of digitally coded switches controlled by a ring counter or a commutating circuit 40. The shift registers 25 of FIGS. 5 and 7 contain N–1 stages; where N in FIG. 7 is 32 but can be expanded to fulfill system requirements. The shift pulses are provided by the clock pulse generator 26 and the sample pulses derived therefrom occur every N shift pulses to gate the sampling switches S. All shift pulses other than the sampling pulses operate the switch S′ to gate the feedback loop 31.

At the instant the sample pulse occurs, the analog-digital converter contains the present value of the input signal and the shift registers 25 contain the last N–1 samples of the input in increasing order of age reading from left to right in the figures. When the shift pulse occurs, the oldest sample in the shift registers is regeneratively fed back via feedback loop 31 to the first position of bit storage in the shift registers 25. The next pulse being the Nth pulse or sample pulse will cause the next sample to be destructively read into the first position of shift registers 25, thereby discarding the oldest sample and inserting therefor the new value of the input signal in its place. The sample pulse is then returned to zero, and the next N–1 shift pulses simply rotate the stored information in the shift registers. At the end of N cycles the information in the shift registers is again in the order of increasing age and another new sample can be inserted to replace the oldest one in the manner described hereinabove.

During the shifting interval, each of the last N samples has been shifted past the output of the shifting loop in decreasing order of N, i.e., from the oldest to the newest sample. Thus, in each cycle the system has passed the samples stored in the shift registers past the input of the digital multiplier 32 in a predetermined sequence and simultaneously up-dated its information, so that the samples appearing sequentially at the output will always be the most recent N samples. It should be evident that the shift pulses must occur at N times the rate of the sample pulses and that the interval between sample pulses must be T.

During the shifting interval, i.e., that interval of time between sample pulses, and N-word memory which is the digital form of the input pulse response must be read from the impulse response generator 30 to the multiplier 32 in the proper time sequence. The proper time sequence is obtained by reading digitally stored data from the input response generator 30 in decreasing order of N and feeding this data to the multiplier along with the output of the shift register loops. The instantaneous product $h(nT)f(t-nT)$ will be formed by multiplier 32. Summing the outputs of the multiplier over the interval between sample pulses gives the desired output:

$$g(t)=\sum_{n=0}^{n=N-1} h(nT)f(t-nT)$$

This summing operation may be accomplished by converting back to analog form in the digital-to-analog converter 33 and averaging in a low pass filter 34 with a time constant approximately equal to T.

A display or utilization device 38 takes its input from the low pass filter 34. Any display or detection device can be used to visually display or sense the output signal $g(t)$ of the digital filter; e.g., an oscilloscope could be used as a display device or a threshold detector and associated alarm could be used.

The input pulse response generator 30 shown in FIG. 6 consists of N shift register stages connected in ring counter fashion. Only one stage of the ring counter 40 contains a "1" at any time. The output of each stage is fed to a rotary switch 41 which produces at its output terminals a digital code value corresponding to the predetermined switch position when the input to the switch is a "1" or a "0" when the input to the switch is a zero. Each of the N switches may be set in a predetermined manner so as to provide the desired digital output value when that switch is interrogated. Thus, the effect of the ring counter 40 is to interrogate the N switches of the rotary switch 41, consecutively, and produce a digital output code from the switch being interrogated. When the outputs corresponding to the given bit from each switch are logically added (OR), the output of the OR gates 42 will be a series of digital words representing consecutively the position of each switch. Thus, the switch positions represent the coefficients $h(nT)$ of the impulse response in decreasing order of N along the ring counter.

In operation it may be observed that since the input response generator 30 has thirty-two stages as shown in FIG. 7 as compared with the thirty-one stages of the shift registers 25, a sample which is read into the left most position of the shift register 25 at the time of the sample pulse will be shifted along the shift registers 25 and simultaneously appear at the multiplier with the digital input response value which corresponds to the zero delay value $h(O)$ of the impulse response. Referring to FIG. 3, this would correspond to the product formed at coefficient digital multipliers 21 by the multiplication of the input signal by the discrete impulse response value $h(O)$. After the next thirty-one shift pulses this same sample will again appear at the multiplier 32 but since the impulse response generator 30 has thirty-two stages rather than thirty-one, the impulse response appearing simultaneously with the sample will have been shifted by one stage and the multiplication which takes place will correspond to that resulting at tap 2 in the passive delay line system shown in FIG. 3. It may be seen that the input signal has been time delayed over one time interval T and multiplied by the impulse response value $h(T)$ of the coefficient digital multiplier 21 which is connected to tap 2. Each succeeding cycle of operation will result in a similar shifting of the same pulse along the delay line, and the resulting products when converted back to analog form and averaged over the time interval will provide the desired convolution integral output.

It should be understood of course that the foregoing disclosure relates only to a preferred embodiment of the invention and that numerous modifications or alterations may be made therein without departing from the spirit and scope of the invention as set forth in the appended claims. For example, the impulse response signals instead of being internally derived from the internal impulse response generator shown in FIG. 6 could be externally generated in another piece of equipment and fed to the multiplier 32.

What is claimed is:

1. A digital filter having an adjustable impulse response for filtering an analog input signal supplied to said filter comprising:

conversion means for providing digital values of the analog input signal, sampling means connected to said conversion means for sequentially enabling said conversion means at predetermined times, digital storage means connected to said conversion means for receiving digital values of said input signal, said digital storage means regeneratively shifting said digital values within said storage means at a predetermined time interval, clock pulse generating means connected to said sampling means and said digital storage means for enabling said sampling means at a first predetermined time interval and said digital storage means at a second predetermined time interval, digital impulse generator means for providing digital impulse response signals in a predetermined sequence, said generator means comprising adjustable digital switches for presetting the impulse response of said filter, commutating means connected to said digital switches for sequentially interrogating said digital switches, and pulse generating means connected to said commutating means for enabling said commutating means at said second predetermined interval, multiplier means connected to said digital impulse generator means and said digital storage means for providing the products of said digitally stored and digitally generated signals, converting means connected to said multiplier means for providing an analog signal from said products, whereby said digital filter produces an output signal corresponding to the convolution integral of said analog input signal and said impulse response signal.

2. A digital filter having an adjustable impulse response characteristic in the real time domain for filtering an analog input signal supplied to the filter comprising:

converting means for digitalizing the analog input signal supplied to the filter, sampling means connected to said converting means for obtaining digitalized voltage values of said input signal at predetermined times, regenerative shift register means connected to said sampling means for shifting said digitalized voltage values along said shift register, multiplier means connected to said shift register means for receiving said digitalized voltage values therefrom, generating means connected to said multiplier means for supplying discrete impulse signals to said multiplier means in a predetermined sequence, said generating means comprising a ring counter having a plurality of stages for cyclically rotating stored information through said stages, a plurality of switches each connected to a stage of said ring counter to provide an impulse signal value when energized, logical adders selectively connected to each of said switches for gating said impulse signal value from said switches to said multiplier means, converting means connected to said multiplier for converting digitalized signals into analog signals, averaging means connected to said digital-to-analog converting means for averaging the output signals of said digital-to-analog converting means, display means connected to said averaging means for displaying the composite of signals emanating from said averaging means, whereby the convolution integral of said input signal and said impulse response signal is displayed on said display means.

References Cited by the Examiner

UNITED STATES PATENTS

| | | | |
|---|---|---|---|
| 2,840,308 | 6/1958 | Van Horne | 235—181 |
| 2,958,039 | 10/1960 | Anderson | 179—15.55 |
| 2,972,733 | 2/1961 | Bucy | 340—15.5 |
| 3,104,284 | 9/1963 | French et al. | 179—15.55 |
| 3,145,341 | 8/1964 | Andrew | 235—181 X |
| 3,185,958 | 5/1965 | Masterson et al. | 235—181 X |

MALCOLM A. MORRISON, *Primary Examiner.*

I. KESCHNER, *Assistant Examiner.*